US008861381B2

(12) United States Patent
Sasaoka

(10) Patent No.: US 8,861,381 B2
(45) Date of Patent: Oct. 14, 2014

(54) EXCHANGE SYSTEM AND SERVER DEVICE

(75) Inventor: Satoru Sasaoka, Kanagawa (JP)

(73) Assignee: Oki Electric Industry Co., Ltd., Tokyo (JP)

(*) Notice: Subject to any disclaimer, the term of this patent is extended or adjusted under 35 U.S.C. 154(b) by 1194 days.

(21) Appl. No.: 12/314,437

(22) Filed: Dec. 10, 2008

(65) Prior Publication Data
US 2009/0219922 A1 Sep. 3, 2009

(30) Foreign Application Priority Data
Feb. 29, 2008 (JP) ................. 2008-050492

(51) Int. Cl.
G01R 31/08 (2006.01)
H04L 12/28 (2006.01)
H04M 15/00 (2006.01)
H04M 3/00 (2006.01)
H04M 3/42 (2006.01)
H04L 29/12 (2006.01)
H04L 12/66 (2006.01)
H04M 7/00 (2006.01)

(52) U.S. Cl.
CPC ..... H04M 3/42255 (2013.01); H04L 29/12037 (2013.01); H04L 12/66 (2013.01); H04M 3/42314 (2013.01); H04M 3/42374 (2013.01); H04M 7/006 (2013.01); H04M 2203/1091 (2013.01)
USPC ........... 370/252; 370/256; 379/111; 379/242; 379/256

(58) Field of Classification Search
CPC ..................... H04L 12/66; H04L 29/12037
USPC ................ 370/252–256; 379/111, 242, 256
See application file for complete search history.

(56) References Cited

U.S. PATENT DOCUMENTS 6,633,638 B1* 10/2003 De Trana et al. .............. 379/242
2002/0076010 A1* 6/2002 Sahai .......................... 379/88.19
2004/0028197 A1* 2/2004 Gray et al. ................. 379/93.01

(Continued)

FOREIGN PATENT DOCUMENTS

JP   H06-253017 A    9/1994
JP   2005-018194     1/2005
JP   2005-236670 A   9/2005
WO   WO-2006/107034 A1  10/2006

OTHER PUBLICATIONS

Japanese Office Action issued on Apr. 20, 2012 with English translation.

(Continued)

Primary Examiner — Brandon Renner
(74) Attorney, Agent, or Firm — Rabin & Berdo, P.C.

(57) ABSTRACT

An exchange apparatus serves a plurality of telephone terminals and a server device is connected to the exchange apparatus via an exchange network and that, in a case in which the plurality of telephone terminals are grouped, stores in association and administers, for each group, a different single number and identification information of the at least one telephone terminal belonging to the group. When a call is originated with a predetermined single number from an originating side telephone terminal, the exchange apparatus performs a query to the server device for a connection destination corresponding to the predetermined single number, and implements a call connection between a telephone terminal of a connection destination, which is a result from the server device in response to the query, and the originating side telephone terminal.

7 Claims, 15 Drawing Sheets

(56) References Cited

U.S. PATENT DOCUMENTS

| | | | |
|---|---|---|---|
| 2004/0198454 A1* | 10/2004 | Chavez et al. | 455/565 |
| 2005/0163164 A1* | 7/2005 | Cramer et al. | 370/486 |
| 2006/0188084 A1* | 8/2006 | Rogers et al. | 379/265.01 |
| 2007/0121602 A1* | 5/2007 | Sin et al. | 370/356 |
| 2007/0153773 A1* | 7/2007 | Miyata et al. | 370/352 |
| 2008/0080683 A1* | 4/2008 | Hasegawa | 379/111 |

OTHER PUBLICATIONS

Chinese Office Action issued on Jun. 24, 2011 with English translation.
Chinese Office Action issued on May 3, 2012 with English translation.
Chinese Office Action issued on Nov. 19, 2012 with English translation.

* cited by examiner

FIG. 5

| 106a | 106b | 106c | 106d | 106e |
|---|---|---|---|---|
| ONE-NUMBER | PRIORITY CONNECTION DESTINATION | TERMINAL PRESENCE | ONE-NUMBER PRESENCE | CONNECTION DESTINATIONS FOR CASES WHERE CONNECTION TO TOP-PRIORITY CONNECTION TERMINALS IS NOT POSSIBLE |
| 6000 | 601 (IP TELEPHONE) | TALKING | TALKING | TALKING: VOICEMAIL DEVICE |
| | 602 (PORTABLE TELEPHONE) | AVAILABLE (CONNECTION POSSIBLE) | | OUT OF RANGE: VOICEMAIL DEVICE |
| 7000 | 701 (PORTABLE TELEPHONE) | OUT OF RANGE (OUT OF INTERNAL LINE RANGE) | OUT OF RANGE | TALKING: VOICEMAIL DEVICE |
| | 702 (IP TELEPHONE) | AVAILABLE (CONNECTION POSSIBLE) | | OUT OF RANGE: PORTABLE TELEPHONE |
| 8000 | 801 (IP TELEPHONE) | AVAILABLE (CONNECTION POSSIBLE) | AVAILABLE | NONE REGISTERED |
| | 802 (PORTABLE TELEPHONE) | OUT OF RANGE (OUT OF INTERNAL LINE RANGE) | | |
| 9000 | 901 (IP TELEPHONE) | AVAILABLE (CONNECTION POSSIBLE) | AVAILABLE | NONE REGISTERED |
| | 902 (PHS) | AVAILABLE (CONNECTION POSSIBLE) | | |

106
DATABASE
(ONE-NUMBER SERVER 100)

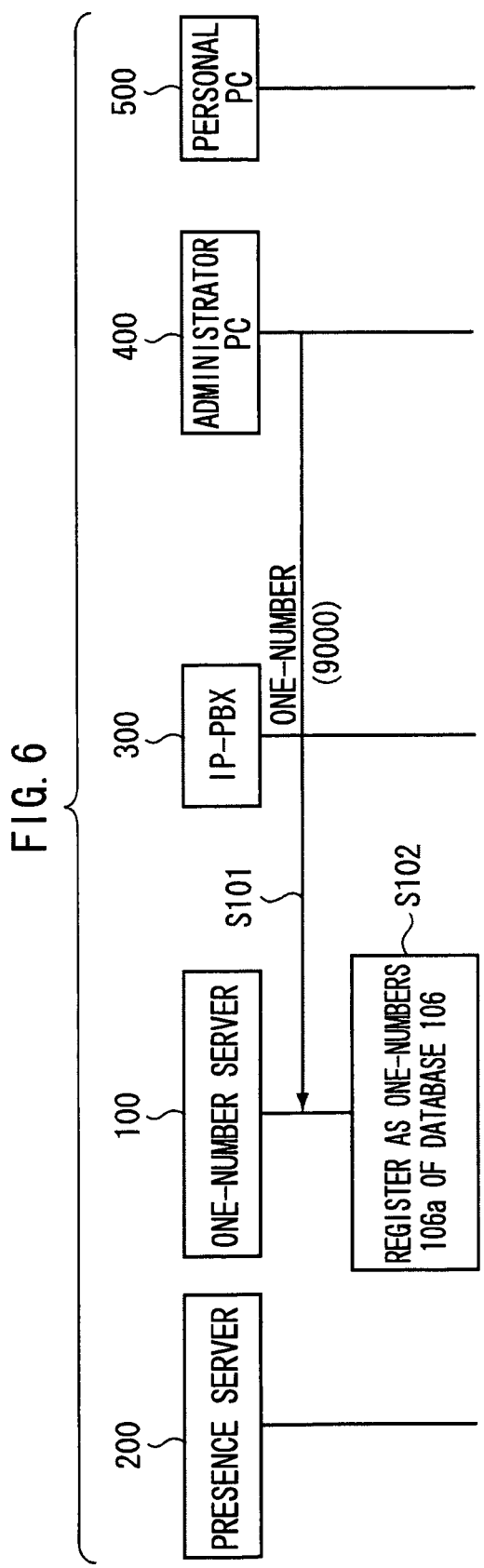

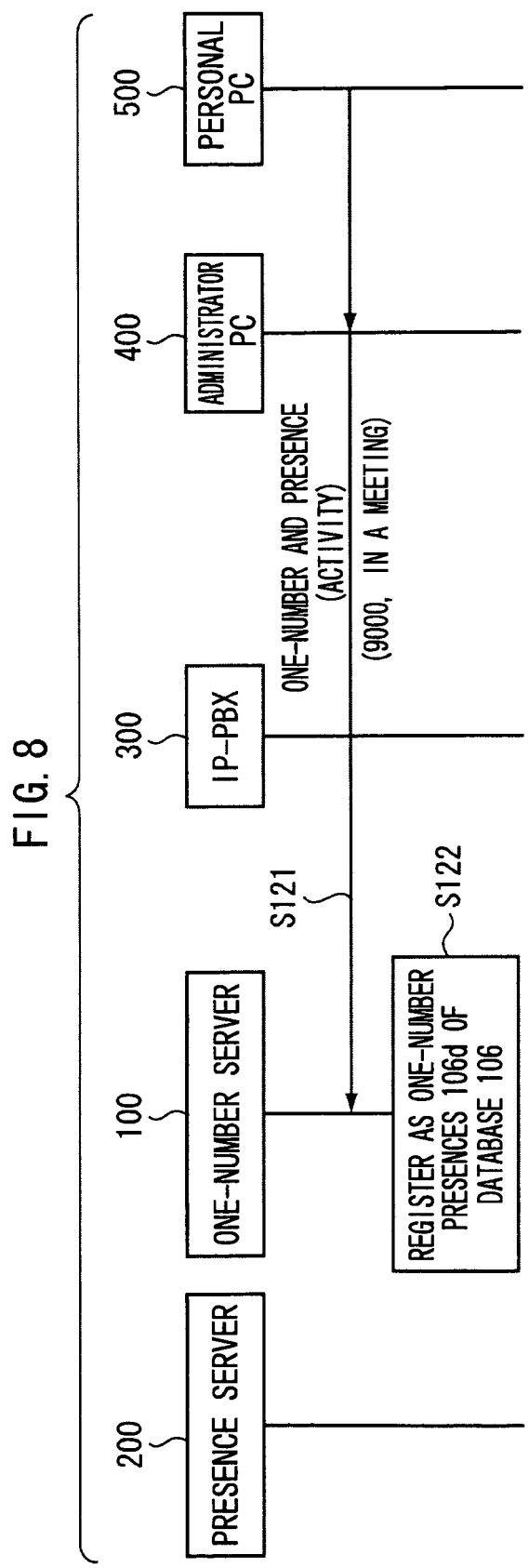

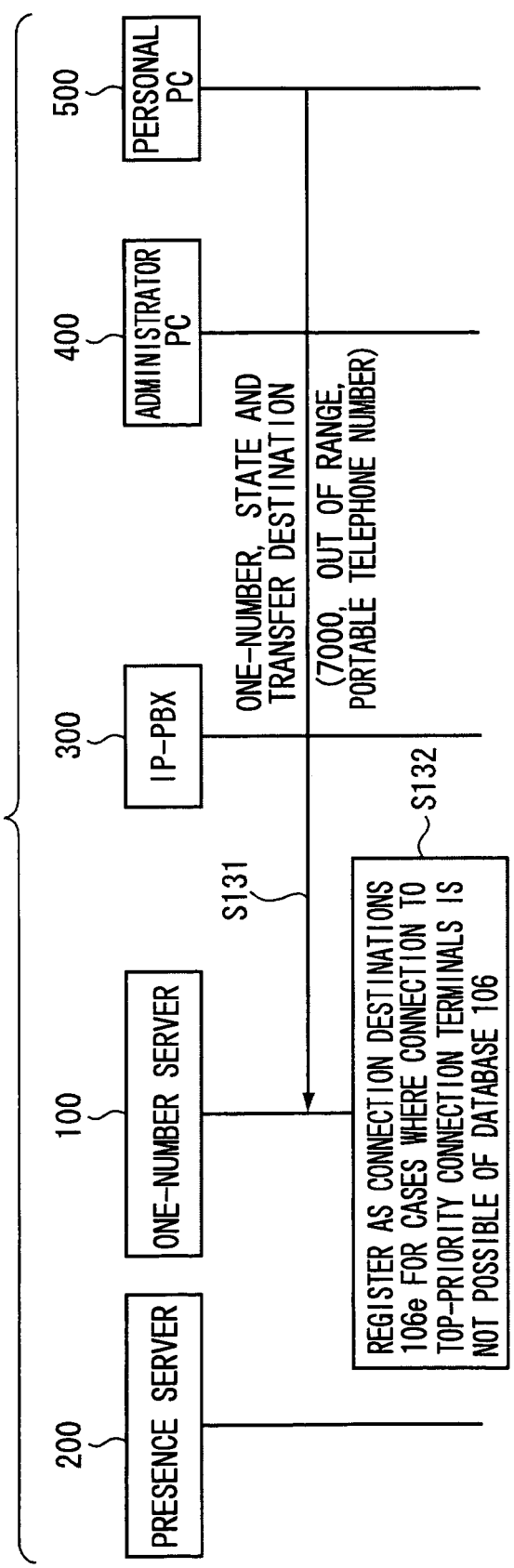

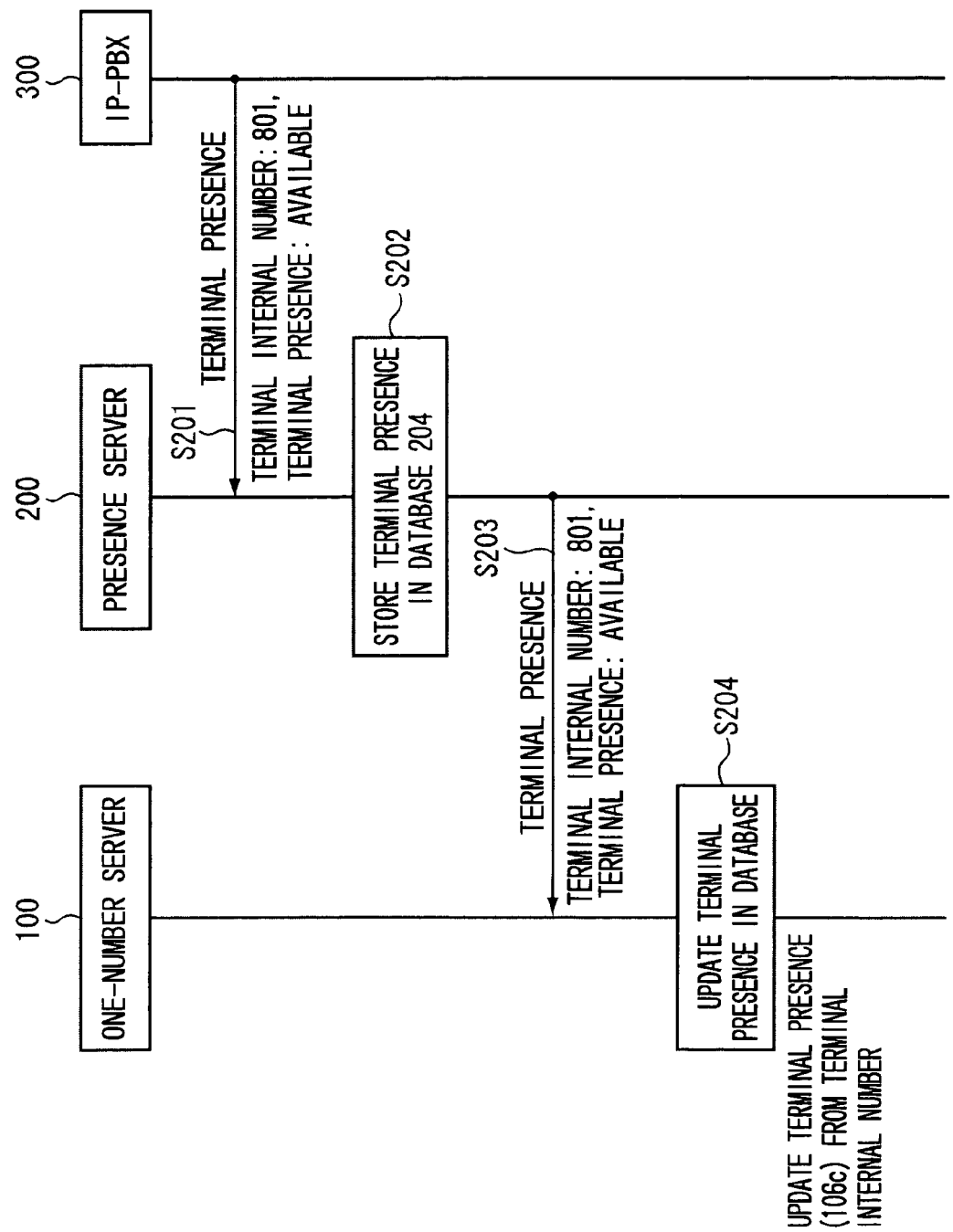

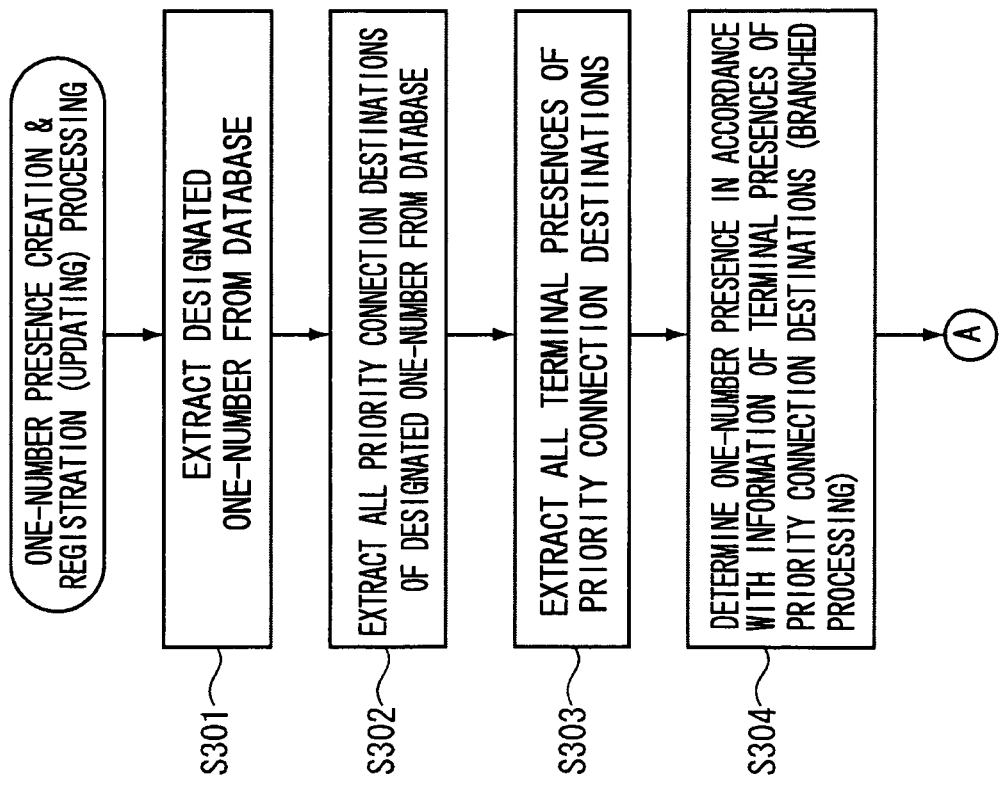

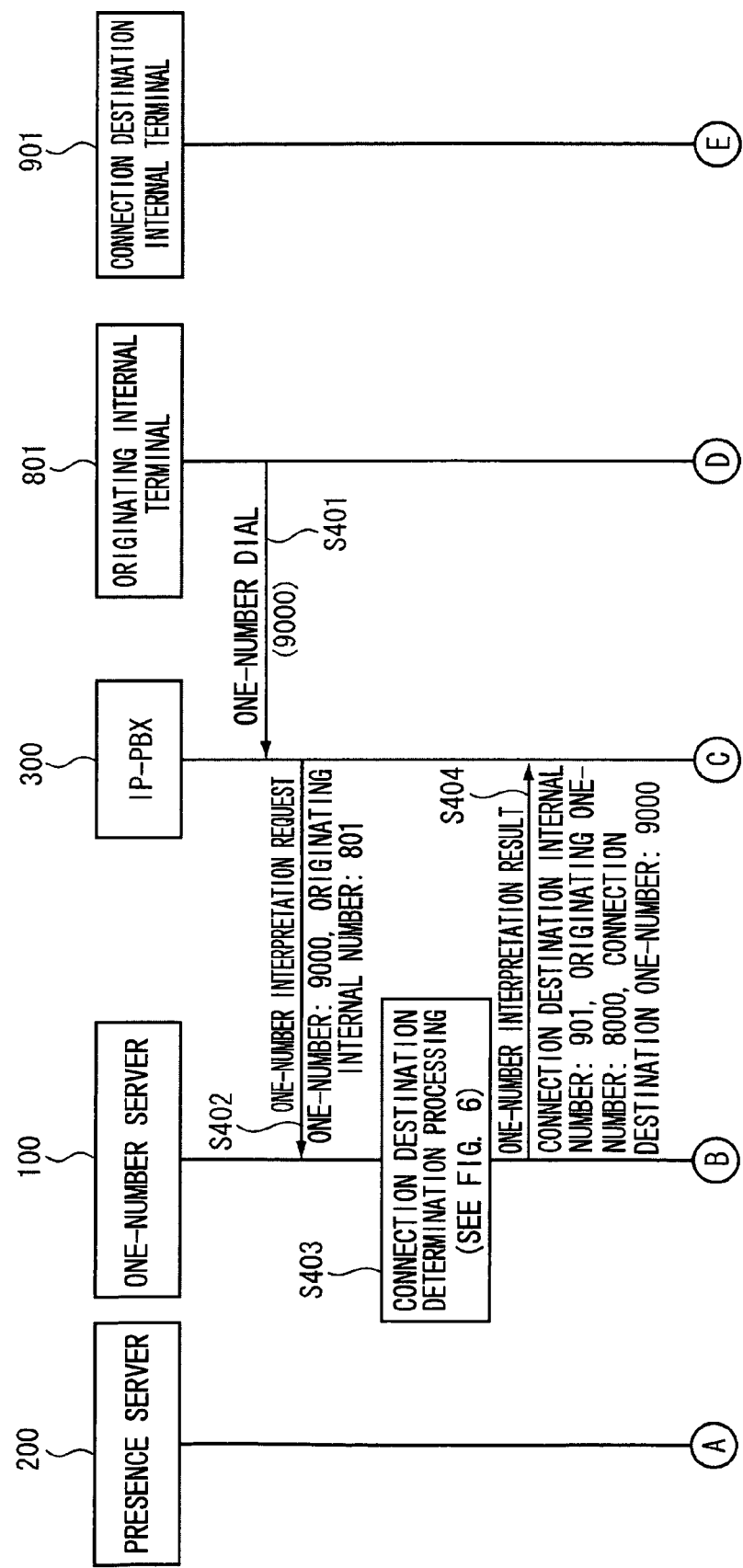

EXCHANGE SYSTEM AND SERVER DEVICE

CROSS-REFERENCE TO RELATED APPLICATION

This application claims priority under 35 USC 119 from Japanese Patent Application No. 2008-050492, the disclosure of which is incorporated by reference herein.

BACKGROUND OF THE INVENTION

1. Field of the Invention

The present invention relates to an exchange system and a server device, and is applicable to, for example, an IP-PBX system.

2. Description of the Related Art

A conventional IP-PBX system includes a function for, when a telephone terminal is moved from a previous location to a different location, automatically connecting to the telephone terminal at the destination of the move in response to the presence of the telephone terminal, a function for displaying information on the presence of a user to a third party, and so forth.

An IP-PBX system has been implemented in which, for example, a plurality of IP telephones serving as internal telephones that are connected to a wired LAN, portable telephones that are connected to a wireless LAN (wireless LAN dual terminals), and an IP-PBX, which serves these IP telephones and portable telephones, are connected to an IP network via the wired LAN or wireless LAN.

In such a case, the above-mentioned portable telephones are used as internal telephone terminals within a company (within range of the wireless LAN), and are used as portable telephones at external destinations (out of range of the wireless LAN).

Accordingly, in the conventional IP-PBX system, when a caller initiates a call to a portable telephone with a number of the portable telephone, according to a function for automatically making connections, if the presence of the portable telephone is within range of the wireless LAN, the system connects to the portable telephone as an internal telephone terminal, whereas if the presence of the portable telephone is out of range of the wireless LAN, the system automatically transfers to the portable telephone using external lines (an automatic connection).

Moreover, in the conventional IP-PBX system, a user may also, by operating a telephone terminal, perform registrations to the effect of "connect to a transfer destination if absent" and "connect to a transfer destination if currently talking" (registration of transfer destinations using a "transfer function"). (See, for example, Japanese Patent Application Laid-Open (JP-A) No. 2005-018194.)

In JP-A No. 2005-018194, an exchange automatically changes a transfer destination for receiving calls to users on the basis of a user presence state table which indicates presences of the users.

However, with a conventional IP-PBX system, a caller needs to know (be aware of) both the telephone number of an IP telephone that serves as an internal telephone (an internal number) and the telephone number of a portable telephone (wireless LAN dual terminal) of the recipient (a portable telephone number).

For example, if an IP telephone and a portable telephone (wireless LAN dual terminal) are assigned to a user A, then when a user B makes a call to user A, user B must carry out either of an operation to originate a call with the internal number of the IP telephone (a dialing operation) and an operation to originate a call with the portable telephone number of the portable telephone (wireless LAN dual terminal).

Furthermore, with the conventional IP-PBX system, when a call connection is to be implemented with the internal number of the internal telephone and user B calls the IP telephone that serves as the internal telephone for user A, it is necessary to perform operations for originating the call with the internal number of the IP telephone.

Therefore, if, for example, user A moves to a different desk because of an organizational change in a company and user A is assigned an IP telephone (internal telephone) with a different internal number from the internal number of the IP telephone (internal telephone) before the move, then when user B makes a call to the IP telephone that serves as an internal telephone for user A, user B must look up (confirm) the internal number of the IP telephone at the destination of the move before performing an operation to initiate the call.

SUMMARY OF THE INVENTION

An object of the present invention is to provide an exchange system capable of collectively managing one or more telephone terminals with a single number and implementing control of call connections in accordance with the single number.

A further object of the present invention is to provide a server device capable of collectively managing one or more telephone terminals with a single number and providing a service in which control of call connections is implemented in accordance with the single number and a presence corresponding to the single number.

A first aspect of the present invention is an exchange system including: an exchange apparatus that serves a plurality of telephone terminals; and a server device that is connected to the exchange apparatus via an exchange network and that, in a case in which the plurality of telephone terminals are grouped, stores in association and administers, for each group, a different single number and identification information of the at least one telephone terminal belonging to the group, wherein, when a call is originated with a predetermined single number from an originating side telephone terminal, the exchange apparatus performs a query to the server device for a connection destination corresponding to the predetermined single number, and implements a call connection between a telephone terminal of a connection destination, which is a result from the server device in response to the query, and the originating side telephone terminal.

A second aspect of the present invention is a server device that is connected to an exchange apparatus via an exchange network, the exchange apparatus serving a plurality of telephone terminals, and the server device including: a storage component that, in a case in which the plurality of telephone terminals are grouped, stores, in correspondence with a different single number for each group, identification information of at least one telephone terminal, the identification information of the telephone terminals being different, presence information corresponding to the single number, and alternative connection destination information which represents an alternative connection destination for a case in which connection to a top-priority destination telephone terminal is not possible, the top-priority destination telephone terminal being a connection destination among the at least one telephone terminal; a presence information determination component that collects presence information of the plurality of telephone terminals and, for each group, determines the presence information corresponding to the single number of the group on the basis of the presence information of the at least one telephone terminal belonging to the group; and a connection destination determination processing component that, when the server device receives a query for a connection destination for a predetermined single number from the exchange apparatus, determines an optimum connection destination on the basis of storage contents of the storage component, and returns information representing the optimum connection destination to the exchange apparatus.

According to the first aspect of the present invention, one or more telephone terminals can be collectively managed with a single number, and control of call connections in accordance with the single number can be implemented.

According to the second aspect of the present invention, one or more telephone terminals can be collectively managed with a single number, and a service can be provided in which control of call connections is implemented in accordance with the single number and a presence corresponding to the single number.

BRIEF DESCRIPTION OF THE DRAWINGS

FIG. 5 is a diagram showing an example of a database provided in the one-number server relating to the exemplary embodiment of the present invention.

FIG. 6 is a sequence chart showing a processing sequence of registration processing and alteration processing of a one-number, by the IP-PBX system relating to the exemplary embodiment of the present invention.

FIG. 8 is a sequence chart showing a processing sequence of registration processing and alteration processing of an activity state of the one-number, by the IP-PBX system relating to the exemplary embodiment of the present invention.

FIG. 9 is a sequence chart showing a processing sequence of registration processing and alteration processing of a connection destination for cases where connection to a top-priority connection terminal is not possible, by the IP-PBX system relating to the exemplary embodiment of the present invention.

FIG. 10 is a sequence chart showing a processing sequence of reception processing of a terminal presence, by the IP-PBX system relating to the exemplary embodiment of the present invention.

FIG. 11A and FIG. 11B are a flowchart showing a processing sequence of creation processing and registration (update) processing of a one-number presence, by the one-number server relating to the exemplary embodiment of the present invention.

FIG. 12A and FIG. 12B are a sequence chart showing a processing sequence of connection processing for the one-number, by the IP-PBX system relating to the exemplary embodiment of the present invention.

DETAILED DESCRIPTION OF THE INVENTION

Figure 1:
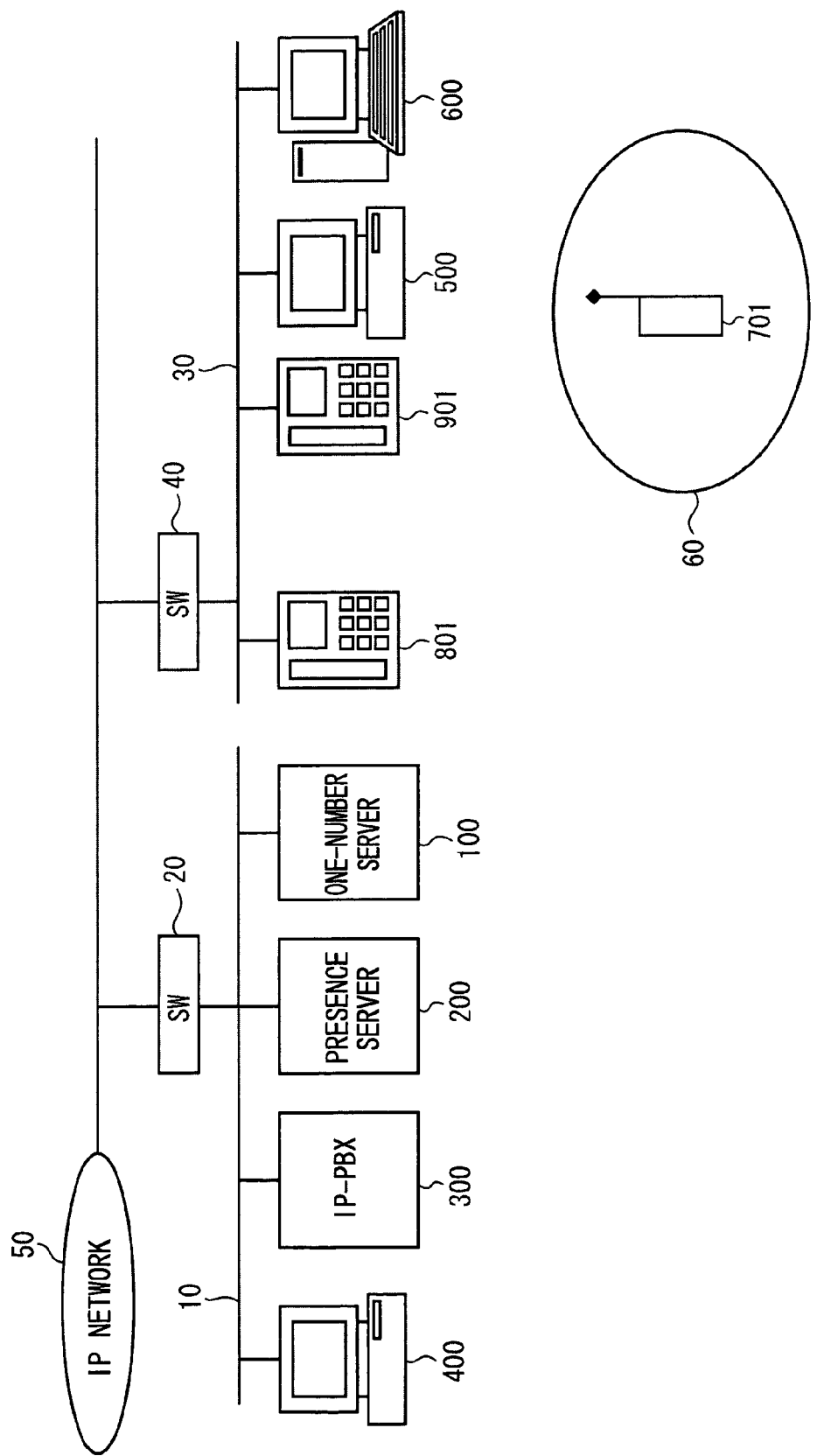
FIG. 1 is a structural diagram showing structure of an IP-PBX system relating to an exemplary embodiment of the present invention.

Herebelow, a best exemplary embodiment for carrying out the present invention will be specifically described while referring to the drawings. Herein, the same reference numeral is assigned to structural elements that are the same in the attached drawings, and duplicative descriptions will not be given.

(A) Principal Exemplary Embodiment (A-1) Structure of the Exemplary Embodiment

FIG. 1 is a block diagram showing structure of an IP-PBX system relating to the exemplary embodiment.

In an IP-PBX system 1 shown in FIG. 1, a one-number server 100, a presence server 200, an IP-PBX 300 and an administrator PC 400 are connected to a LAN (local area network) 10, and are connected to an IP network 50 via a switch (a LAN switch) 20. A personal PC 500, a voicemail device 600 and IP telephones 801 and 901 are connected to the IP network 50 via a switch (a LAN switch) 40.

The one-number server 100 features a function for converting a connection destination from a single number (a one-number) to an internal terminal.

The presence server 200 features a function that accumulates information representing the presence of internal terminals (telephone terminals) that are served by the IP-PBX 300 (below referred to as presence information).

The IP-PBX 300 is responsible for overall call control of internal lines and network lines that are served. Herein, the IP-PBX 300 makes a request to the one-number server 100 for resolution of a connection destination internal terminal on the basis of a one-number received from an originating side internal terminal (below referred to as the originating internal terminal), and the IP-PBX 300 receives a result of the request (information on the connection destination internal terminal) from the one-number server 100 and implements a call connection to the connection destination internal terminal.

The administrator PC 400 is, for example, a computer (information processing device), and implements registrations and changes of one-numbers to the one-number server 100.

The personal PC 500 is, for example, a computer (an information processing device), and is capable of implementing: registrations and changes of internal terminals that are connected to with priority for a one-number of an individual (below referred to as priority connection terminals); registrations and changes of activity states of the one-number; and registrations and changes of connection destinations for cases when connection is not possible to a top-priority priority connection terminal among the priority connection terminals, that is, an internal terminal that is connected to with top priority (below referred to as the top-priority connection terminal).

The voicemail device 600 features a function that, in conditions such as when it is not possible to connect to the top-priority connection terminal for a connection with the one-number or the like, connects with the originating internal terminal and records a voice message from the originating internal terminal.

The IP telephones 801 and 901 function as respective internal terminals (telephone terminals), and are served by the IP-PBX 300.

A portable telephone 701 is served by a portable telephone carrier network 60.

Figure 2:
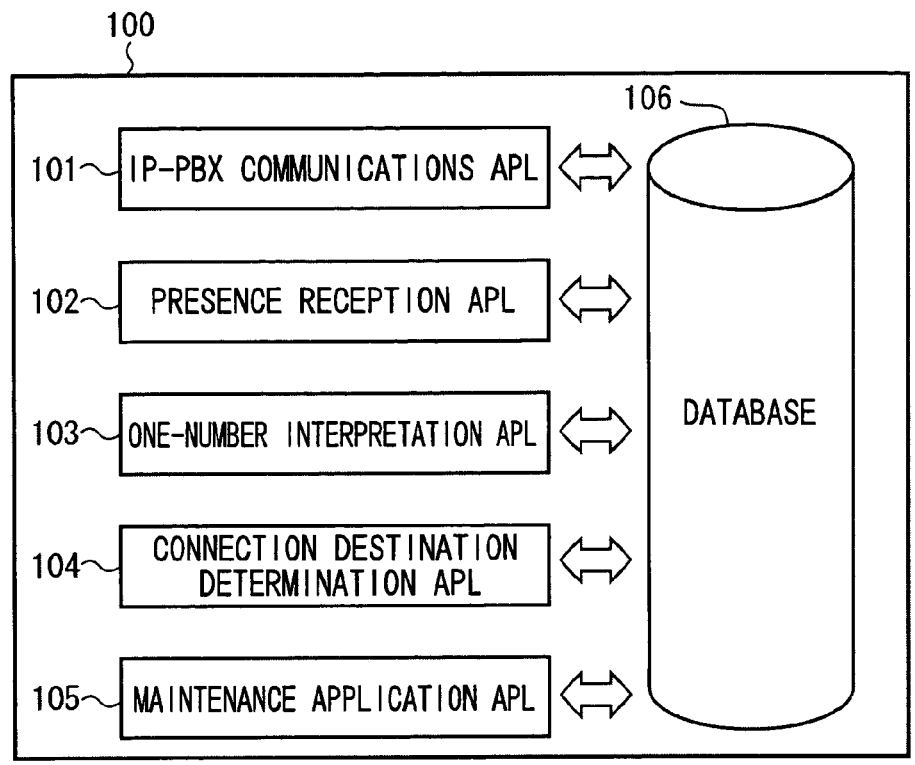
FIG. 2 is a structural diagram showing structure of a one-number server relating to the exemplary embodiment of the present invention.

As shown in FIG. 2, the one-number server 100 includes an IP-PBX communications APL 101, a presence reception APL 102, a one-number interpretation APL 103, a connection destination determination APL 104, a maintenance application APL 105 and a database 106.

The database 106 is a database storing various kinds of information, such as one-numbers, presences and connection destinations. Details of this database 106 will be described later.

The IP-PBX communications APL 101 receives a one-number interpretation request from the IP-PBX 300 and passes the same to the connection destination determination APL 104, and returns a connection destination determined by the connection destination determination APL 104 to the IP-PBX 300.

The presence reception APL 102 receives presence information of an internal terminal served by the IP-PBX 300 from the presence server 200, and stores presence information for each internal terminal in the database 106.

On the basis of the one-number included in the one-number interpretation request passed from the IP-PBX communications APL 101 and the information on one-numbers and connection destinations registered in the database 106, the one-number interpretation APL 103 extracts a connection destination corresponding to the one-number included in the one-number interpretation request.

The connection destination determination APL 104 determines an optimum connection destination on the basis of the result extracted by the one-number interpretation APL 103 and the one-numbers and presence information registered in the database 106, and passes this determination result (optimum connection destination information) to the IP-PBX communications APL 101.

The maintenance application APL 105 receives one-number data registrations, connection destination registrations and changes to such registration information from the administrator PC 400 and the personal PC 500, and registers the same in the database 106.

Figure 3:
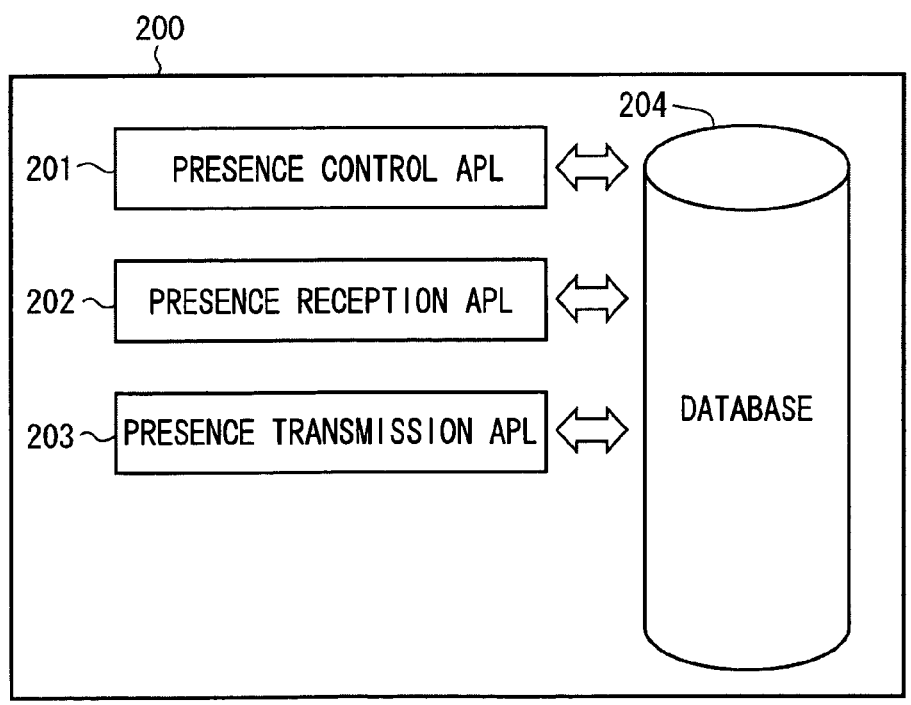
FIG. 3 is a structural diagram showing structure of a presence server relating to the exemplary embodiment of the present invention.

As shown in FIG. 3, the presence server 200 includes a presence control APL 201, a presence reception APL 202, a presence transmission APL 203 and a database 204.

The database 204 is a database that stores presence information for each internal terminal.

The presence control APL 201 sends presence information read from the database 204 to an internal terminal that has a presence display function.

The presence reception APL 202 receives presence information sent from the IP-PBX 300 and stores the presence information in the database 204.

The presence transmission APL 203 sends presence information, which is read from the database 204, to the one-number server 100.

Figure 4:
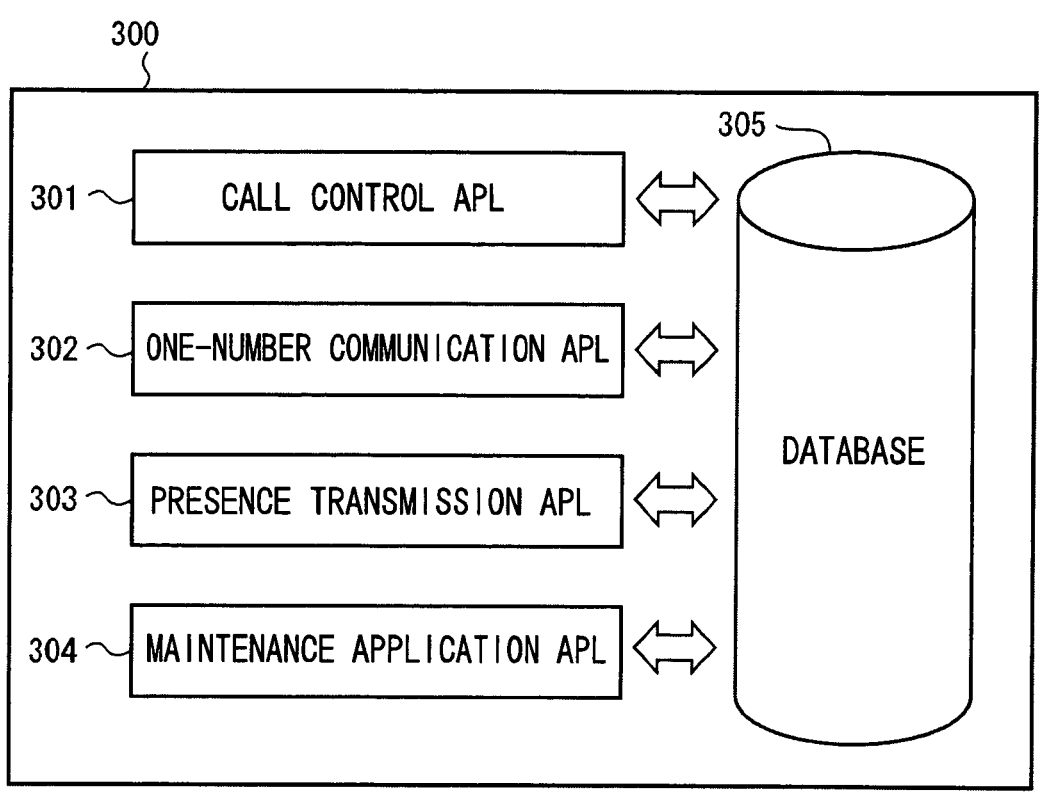
FIG. 4 is a structural diagram showing structure of an IP-PBX relating to the exemplary embodiment of the present invention.

As shown in FIG. 4, the IP-PBX 300 includes a call control APL 301, a one-number communication APL 302, a presence transmission APL 303, a maintenance application APL 304 and a database 305.

The call control APL 301 carries out control of overall connections with internal terminals and network lines served by the IP-PBX 300.

The one-number communication APL 302 sends a one-number interpretation request received from an internal terminal or a network line to the one-number server 100, receives the result of the interpretation request (information of a determined connection destination) from the one-number server 100, and then passes this result (determined connection destination information) to the call control APL 301.

The presence transmission APL 303 creates presence information of internal terminals and sends the same to the presence server 200.

The maintenance application APL 304 receives data setting requests relating to call control from the administrator PC 400 and registers the same in the database 305.

The database 305 is a database that registers data setting requests relating to call control.

Next, details of the database 106 of the one-number server 100 will be described with reference to FIG. 5.

As shown in FIG. 5, the database 106 includes respective fields for one-numbers 106*a*, priority connection destinations 106*b*, terminal presences 106*c*, one-number presences 106*d*, and connection destinations for cases where connection to top-priority connection terminals is not possible 106*e*.

In FIG. 5, "6000", "7000", "8000" and "9000" are registered in the fields of the one-numbers 106*a*.

In the fields of the priority connection destinations 106*b*: "601 (IP telephone)" and "602 (portable telephone)" are registered as priority connection destinations corresponding to the one-number "6000"; "701 (portable telephone)" and "702 (IP telephone)" are registered as priority connection destinations corresponding to the one-number "7000"; "801 (IP telephone)" and "802 (portable telephone)" are registered as priority connection destinations corresponding to the one-number "8000"; and "901 (IP telephone)" and "902 (PHS)" are registered as priority connection destinations corresponding to the one-number "9000". These internal terminals (telephone terminals) serve as priority connection terminals.

Herein, in a case in which plural internal terminals (eight internal terminals in this example) are grouped, plural internal terminals (two internal terminals in this example) are registered for each one-number and may be described as the internal terminals belonging to the groups. In other words, for each group, the one-number is associated with one or more internal terminals belonging to the group.

An IP telephone 601, a portable telephone 602, an IP telephone 702, a portable telephone 802 and a PHS terminal 902 are connected to the IP network 50.

For example, the IP telephone 601 and the IP telephone 702 are connected to a LAN 30. Further, the portable telephone 602 and the portable telephone 802 are served by the IP-PBX 300 via an IP-compatible wireless LAN access point connected to a LAN that is connected to the IP network 50, such as the LAN 30 or the like. Further, the PHS terminal 902 is served by the IP-PBX 300 via an IP-compatible PHS base station that is connected to a LAN that is connected to the IP network 50, such as the LAN 30 or the like. Further yet, the portable telephone 701 illustrated in FIG. 1 is served by the IP-PBX 300 via an IP-compatible wireless LAN access point that is connected to a LAN that is connected to the IP network 50, such as the LAN 30 or the like.

Incidentally, the portable telephone 602, the portable telephone 701 and the portable telephone 802 are portable terminals that function as internal terminals (internal telephones) within range of a wireless LAN but function as portable telephones out of range of the wireless LAN. That is, these are wireless LAN dual terminals.

The "601", "602", . . . , "902" registered in the fields of the priority connection destinations 106*b* represent internal numbers of internal terminals such as IP telephones, portable telephones and the like. These numbers are also reference numerals assigned to the internal terminals.

In this exemplary embodiment, the above means that, for example, two internal terminals serve as priority connection destinations registered in correspondence with a one-number, and of these two internal terminals, the leading (first) internal terminal is the top-priority (first place in a priority order) internal terminal (i.e., a priority connection terminal and a top-priority connection terminal), and the second internal terminal is in second place in the priority order (i.e., a priority connection terminal). For example, if the one-number "9000" is considered, the internal number "901" (the internal terminal (IP telephone) 901) is the internal terminal with top priority, and the internal number "902" (the PHS terminal 902) is the internal terminal in second place in the priority order.

In the fields of the terminal presences 106c, presences of internal terminals (hereafter referred to as terminal presences) are registered for each of the internal terminals that serve as priority connection destinations corresponding to the respective one-numbers. In this example, the terminal presences are registered as "talking", "available (connection possible)" and "out of range (out of internal line range)". The terminal presence "out of range (out of internal line range)", corresponding to each of the internal number "701" and the internal number "802" which are priority connection destinations in the fields of the priority connection destinations 106b, means outside the range of the wireless LAN.

In the fields of the one-number presences 106d, presences of the one-numbers (hereafter referred to as one-number presences) are registered for each of the one-numbers registered in the fields of the one-numbers 106a. In this example, the one-number presences are registered as "talking", "out of range" and "available".

In the fields of the connection destinations for cases where connection to top-priority connection terminals is not possible 106e, connection destinations for cases in which connection to the top-priority destination connection terminal is not possible are registered for each of the one-numbers registered in the fields of the one-numbers 106a. Naturally, these may have no connection destination registered. In this example, for each of the one-numbers "6000" and "7000", connection destinations for cases in which connection to the top-priority destination terminal is not possible, corresponding to one-number presences other than available (i.e., "talking" and "out of range"), are specified.

Now, in this exemplary embodiment, the one-number server 100 features the functions of a server device that, in a case in which pluralities of telephone terminals (internal terminals) are grouped, stores in association and administers, for each group, a different single number (a one-number) and identification information (internal numbers) of the one or more telephone terminals belonging to the group.

In the one-number server 100, the database 106 features the functions of a storage component that, in the case in which pluralities of telephone terminals (internal terminals) are grouped, stores, for the different single number (one-number) of each group: different identification information (internal numbers) of the one or more telephone terminals (internal terminals); presence information corresponding to that single number; and alternative connection destination information, which represents an alternative connection destination (a voicemail device, a portable telephone or the like) for when connection to a telephone terminal that has top priority as a connection destination among the one or more telephone terminals (i.e., the top-priority telephone terminal) is not possible.

The presence reception APL 102 features the functions of a presence information determination component which collects presence information of the plural telephone terminals and, for each group, determines presence information corresponding to the single number of that group on the basis of the presence information of the one or more telephone terminals belonging to that group.

The functions of a connection destination determination processing component are produced by cooperative operation of the IP-PBX communications APL 101, the one-number interpretation APL 103 and the connection destination determination APL 104.

That is, the functioning of the connection destination determination processing component includes at least the following functions (1) to (3).

(1) When a query for a connection destination for a predetermined single number (one-number) is received from the IP-PBX 300, a function of determining an optimum connection destination on the basis of storage contents of the database (storage component) 106 and returning information (an internal number) representing the optimum connection destination (the top-priority connection terminal) to the IP-PBX 300.

(2) A function of extracting one or more telephone terminals that correspond to the predetermined single number (one-number) from the IP-PBX 300 to serve as priority connection destinations and, if the presence information corresponding to the predetermined single number is information indicating that communication is possible ("available"), returning information (an internal number) representing the telephone terminal that is the pre-specified top-priority connection destination among the extracted priority connection destinations to the IP-PBX 300 to serve as the information representing the optimum connection destination.

(3) A function of extracting one or more telephone terminals that correspond to the predetermined single number (one-number) from the IP-PBX 300 to serve as priority connection destinations and, if the presence information corresponding to the predetermined single number is information indicating that communication is not possible ("talking" or "out of internal line range"), returning the alternative connection destination information corresponding to the predetermined single number (i.e., information representing a voicemail device, a portable telephone or the like) to the IP-PBX 300 to serve as the information representing the optimum connection destination.

Further yet, the maintenance application APL 105 features the function of a telephone terminal information update component and the function of a presence information update component.

(1) The function of the telephone terminal information update component is a function that, when an update of registration details relating to the identification information of a telephone terminal (i.e., the internal number) stored in the database (storage component) 106 is instructed by an access to the one-number server (server device) 100 by an information processing device (a computer) such as the personal PC 500 connected via the IP network 50 or the like, updates the storage contents of the database (storage component) 106 on the basis of the updated telephone terminal identification information (internal number).

(2) The function of the presence information update component is a function in which, when an update of the presence information corresponding to a single number (one-number) stored in the database (storage component) 106 is instructed by an access to the one-number server (server device) 100 by an information processing device (a computer) such as the administrator PC 400 or personal PC 500 connected via the IP network 50 or the like, the maintenance application APL 105 updates the storage contents of the database (storage component) 106 on the basis of the updated presence information (internal number).

Further still, in this exemplary embodiment, in the IP-PBX 300, cooperative operation of the call control APL 301 and the one-number communication APL 302 produces a function in which, when a call is originated with a predetermined single number (one-number) from an originating side telephone terminal, a query for a connection destination corresponding to the predetermined single number is made to the one-number server (server device) 100, and a call connection is implemented between a connection destination telephone terminal, which is a result from the one-number server (server device) 100 in response to this query, and the originating side telephone terminal.

The call control APL 301 features a function that sends the single number (one-number) corresponding to the connection destination telephone terminal that is the result from the one-number server (server device) 100 to the originating telephone terminal and causes the single number to be stored as originating history information, and sends a single number (one-number) corresponding to the originating telephone terminal to the connection destination telephone terminal and causes this single number to be stored as receiving history information.

(A-2) Operation of the Exemplary Embodiment

Firstly, a process of registration of data that is required when call connections are implemented on the basis of one-numbers by the IP-PBX system 1 and a process of registration of data at a time of application, and sequences thereof, will be described with reference to FIG. 6 to FIG. 11B.

(A-2-1) Registration or Alteration of One-Number

Registration processing and alteration processing of one-numbers will be described with reference to FIG. 6. FIG. 6 is a sequence chart showing a processing sequence of registration processing and alteration processing of a one-number by the IP-PBX system 1.

As shown in FIG. 6, the administrator PC 400 accesses the maintenance application APL 105 of the one-number server 100 via the Web. Then, the administrator PC 400 registers a one-number in accordance with a Web display or alters a registered one-number (S101).

(The maintenance application APL 105 of) the one-number server 100 receiving the registration or alteration of the one-number from the administrator PC 400 registers the one-number or alters the registered one-number in the one-numbers 106a of the database 106 (S102) in accordance with an instruction for registration or alteration of the one-number from the administrator PC 400.

For example, in a case in which registration of the one-number "9000" is implemented by the administrator PC 400, the maintenance application APL 105 of the one-number server 100 registers "9000" as a one-number in the fields of the one-numbers 106a of the database 106.

Figure 7:
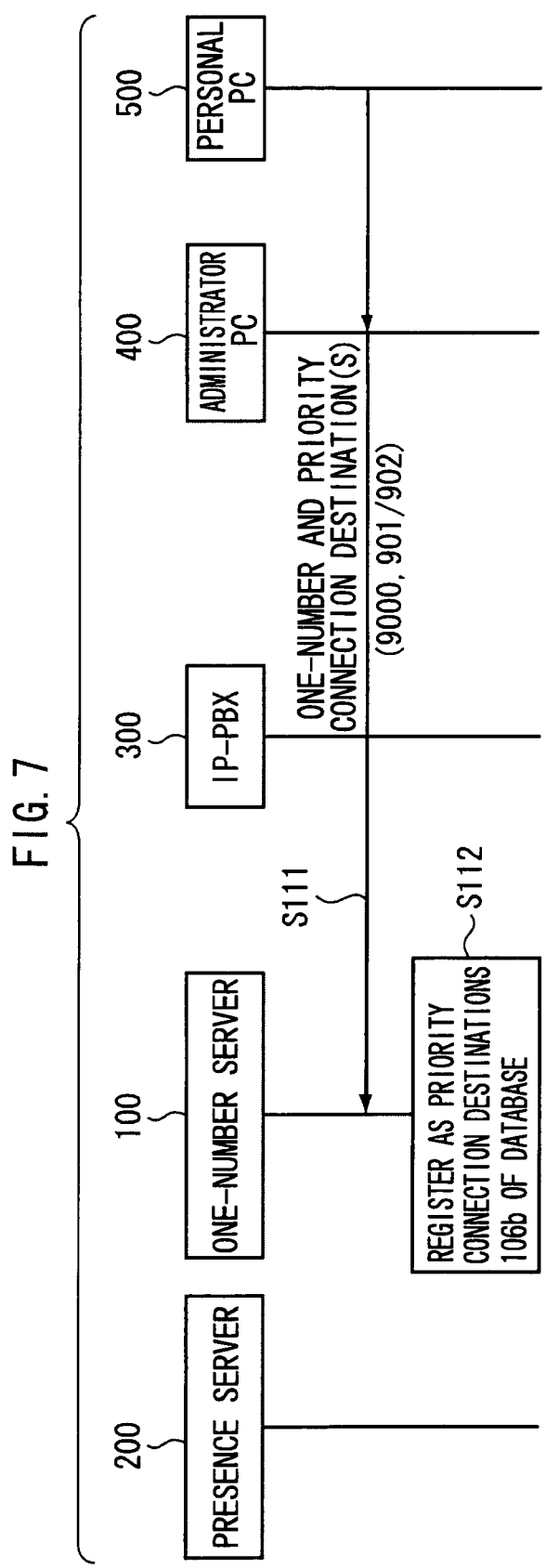
FIG. 7 is a sequence chart showing a processing sequence of registration processing and alteration processing of a priority connection terminal of the one-number, by the IP-PBX system relating to the exemplary embodiment of the present invention.

(A-2-2) Registration or Alteration of Priority Connection Terminal of One-Number Registration processing and alteration processing of priority connection terminals of one-numbers will be described with reference to FIG. 7. FIG. 7 is a sequence chart showing a processing sequence of registration processing and alteration processing of a priority connection terminal of a one-number by the IP-PBX system 1.

Herein, the meaning of a priority connection destination includes, in a case in which plural internal terminals are registered for a one-number, an internal terminal (a priority connection terminal) that must be given priority for connecting when a connection is implemented with the one-number.

As shown in FIG. 7, the administrator PC 400 or personal PC 500 accesses the maintenance application APL 105 of the one-number server 100 via the Web. The administrator PC 400 or personal PC 500 registers a priority connection destination (priority connection terminal) for a one-number in accordance with a Web display or alters a registered priority connection destination (priority connection terminal) (S111). At such a time, there may just as well be one or a plurality of priority connection destinations. However, the internal terminal that is registered at the head of the priority connection destinations 106b is the top-priority connection destination (top-priority connection terminal).

(The maintenance application APL 105 of) the one-number server 100 receiving the registration or alteration of the priority connection destination for the one-number from the administrator PC 400 or personal PC 500 searches the one-numbers 106a of the database 106 and registers or alters the priority connection destinations 106b corresponding to the one-number that is the subject of the registration or alteration (S112).

For example, in a case in which registration of the internal number "901" and the internal number "902" as priority connection destinations for the one-number "9000" is implemented by the administrator PC 400 or personal PC 500, the maintenance application APL 105 of the one-number server 100 registers the internal number "901" and the internal number "902" in the fields of the priority connection destinations 106b in correspondence with the one-number "9000" in the fields of the one-numbers 106a of the database 106.

(A-2-3) Registration or Alteration of Activity State of One-Number

Registration processing and alteration processing of activity states of one-numbers will be described with reference to FIG. 8. FIG. 8 is a sequence chart showing a processing sequence of registration processing and alteration processing of an activity state of a one-number by the IP-PBX system 1.

Herein, the meaning of the term "activity state" includes the automatically changing presence. Regardless thereof, activity of a person (in a meeting, busy or the like) may be registered by the individual to the activity state to serve as the presence.

As shown in FIG. 8, the personal PC 500 accesses the maintenance application APL 105 of the one-number server 100 via the Web. Then, the personal PC 500 registers a one-number presence for a one-number in accordance with a Web display or alters a registered one-number presence (S121).

(The maintenance application APL 105 of) the one-number server 100 receiving the registration or alteration of the one-number presence for the one-number from the personal PC 500 searches the one-numbers 106a of the database 106 and registers or alters the one-number presence 106d (S122) corresponding to the one-number that is the subject of the registration or alteration.

For example, in a case in which a registration of (or alteration to) "meeting" as the one-number presence (activity) for the one-number "9000" is implemented by the personal PC 500, the maintenance application APL 105 of the one-number server 100 registers "meeting" as the one-number presence (activity) in correspondence with the one-number "9000" in the fields of the one-number presences 106d of the database 106.

(A-2-4) Registration or Alteration of Connection Destination for Cases Where Connection to a Top-Priority Connection Terminal is not Possible Registration processing and alteration processing of connection destinations for cases where connection to top-priority connection terminals is not possible will be described with reference to FIG. 9. FIG. 9 is a sequence chart showing a processing sequence of registration processing and alteration processing of a connection destination for cases where connection to the top-priority connection terminal is not possible, by the IP-PBX system 1.

Herein, the meaning of the term "connection destination for cases where connection to the top-priority connection terminal is not possible" includes a connection destination that replaces the top-priority connection terminal when the one-number presence is "talking" or "out of range".

As shown in FIG. 9, the personal PC 500 accesses the maintenance application APL 105 of the one-number server 100 via the Web. The personal PC 500 registers a connection destination for cases where connection to the top-priority connection terminal is not possible for a one-number in accordance with a Web display or alters a registered such connection destination (S131). At this time, a state of the one-number presence ("talking" or "out of range") is specified, and registration or alteration of a connection destination for that state is implemented.

(The maintenance application APL 105 of) the one-number server 100 receiving the registration or alteration of the connection destination for cases where connection to the top-priority connection terminal is not possible for the one-number from the personal PC 500 searches the one-numbers 106a of the database 106 and registers or alters the connection destination for cases where connection to top-priority connection terminals is not possible 106e corresponding to the one-number that is the subject of the registration or alteration (S132).

For example, a registration (or alteration) of "portable telephone number" (portable telephone) as the connection destination for cases where connection to the top-priority connection terminal is not possible, for the one-number "7000" for when the one-number presence (activity) is "out of range", is implemented by the personal PC 500. In this case, the maintenance application APL 105 of the one-number server 100 registers "out of range: portable telephone" as the connection destination in correspondence with the one-number "7000" in the fields of the connection destinations for cases where connection to top-priority connection terminals is not possible 106e of the database 106.

Next, reception of terminal presences and creation and updating of one-number presences will be described with reference to FIG. 10 to FIG. 11B.

(A-2-5) Reception of Terminal Presence

Reception processing of terminal presences will be described with reference to FIG. 10. FIG. 10 is a sequence chart showing a processing sequence of reception processing of a terminal presence by the IP-PBX system 1.

As shown in FIG. 10, each time a call state of an internal terminal served by the IP-PBX 300 changes, the call control APL 301 of the IP-PBX 300 converts this call state to a presence, and passes this presence, which is a terminal presence, to the presence transmission APL 303. The presence transmission APL 303 sends (reports) the terminal presence passed from the call control APL 301 to the presence reception APL 202 of the presence server 200 (S201). At this time, the internal number and terminal presence of the internal terminal are added as parameters of the terminal presence.

At the presence server 200, the presence reception APL 202 reports the received terminal presence to the presence control APL 201, and the presence control APL 201 stores this terminal presence in the database 204 of the presence server 200 (S202).

For example, in a case in which the presence transmission APL 303 of the IP-PBX 300 sends to the presence reception APL 202 a terminal presence in which the parameters of the internal number of the internal terminal "801" and the terminal presence "available" are added, at the presence server 200, the presence control APL 201 stores the internal number of the internal terminal "801" and the terminal presence "available" in association in the database 204 of the presence server 200.

(A-2-6) Reception and Storage of Presence Information by One-Number Server

When a terminal presence is stored in the database 204, the presence control APL 201 of the presence server 200 requests a terminal presence report to the one-number server 100 from the presence transmission APL 203. Accordingly, as shown in FIG. 10, the presence transmission APL 203 receives the terminal presence report and reports the terminal presence to the one-number server 100 (S203). At this time, the internal number and terminal presence of the internal terminal are added as parameters of the terminal presence.

For example, the presence transmission APL 203 reports to the one-number server 100 a terminal presence in which the internal number of the internal terminal "801" and the terminal presence "available" are added as additional information.

At the one-number server 100, the presence reception APL 102 searches the priority connection destinations 106b of the database 106 in accordance with the internal number of the internal terminal in the additional information of the received terminal presence report and, on the basis of a result of the search that is registered in the priority connection destinations 106b, updates contents of the terminal presence 106c that corresponds to the (internal number of the) internal terminal to the terminal presence in the additional information in the terminal presence report (S204).

(A-2-7) Creation and Registration (Updating) of One-Number Presence

Creation processing and registration (updating) processing of one-number presences will be described with reference to FIG. 11A and FIG. 11B. FIG. 11A and FIG. 11B are a flowchart showing a processing sequence of creation processing and registration (update) processing of a one-number presence by the one-number server 100.

Figure 11B:
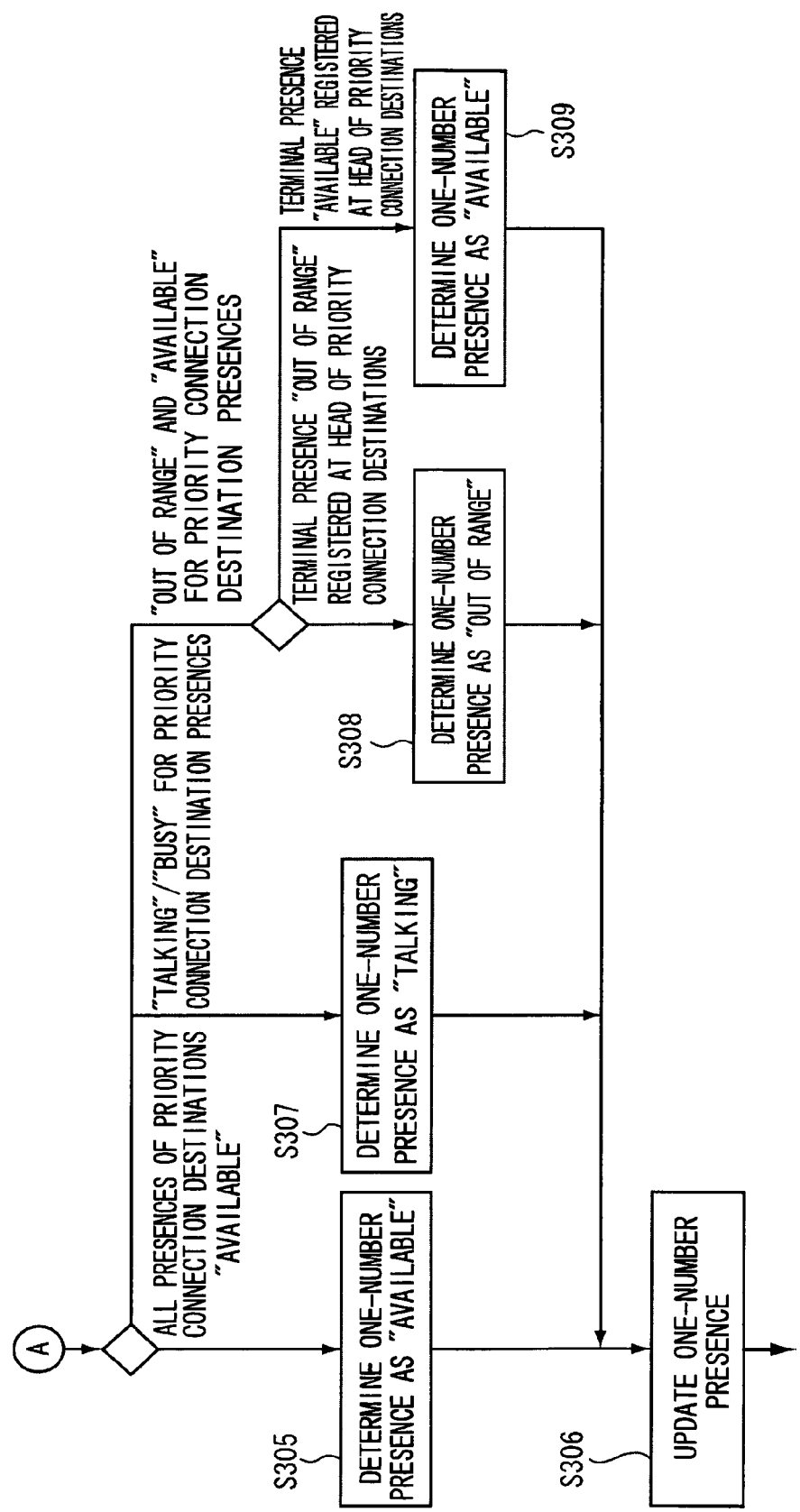

As shown in FIG. 11A and FIG. 11B, at the one-number server 100, the presence reception APL 102 determines a one-number from the one-numbers 106a of the database 106 (step S301) on the basis of an internal number of an internal terminal, which is in the additional information of a received terminal presence report. The presence reception APL 102 extracts all priority connection destinations (internal terminals which are priority connection terminals) corresponding to the determined one-number (step S302), and extracts all the terminal presences corresponding to the extracted priority destination connections (internal terminals) from the terminal presences 106c (step S303).

Then, the presence reception APL 102 determines a one-number presence (step S304) in accordance with the information of terminal presences of all (one or a plurality) of the priority connection destinations (internal terminals) that have been extracted as mentioned above.

In the present exemplary embodiment, the following determination processes (a) to (d) are executed in accordance with the terminal presences of the respective internal terminals) "available", "talking", "busy", "out of range", etc.).

(a) If all of the terminal presences of the priority connection destinations (one or a plurality of internal terminals) are "available", then the presence reception APL 102 determines that the one-number presence is "available" (step S305), and registers or updates the determined one-number presence in the one-number presences 106*d* of the database 106 of the one-number server 100 in correspondence with that one-number (step S306).

In this case, the one-number presence "available" is registered as data corresponding to the one-number in the one-number presences 106*d* of the database 106 in correspondence with that one-number.

(b) If one or more of the terminal presences of the priority connection destinations (one or a plurality of internal terminals) is "talking", "busy" or "in a meeting", then the presence reception APL 102 determines that the one-number presence is "talking" (step S307), and subsequently proceeds to step S306.

In this case, the one-number presence "talking" is registered as the data corresponding to the one-number in the one-number presences 106*d* of the database 106 in correspondence with that one-number.

(c) If the terminal presences of the priority connection destinations (one or a plurality of internal terminals) are "available" and "out of range" and the internal terminal registered at the head of the priority connection destinations 106*b* of the database 106 has an "out of range" terminal presence, then the presence reception APL 102 determines that the one-number presence is "out of range" (step S308), and subsequently proceeds to step S306.

In this case, the one-number presence "out of range" is registered as the data corresponding to the one-number in the one-number presences 106*d* of the database 106 in correspondence with that one-number.

(d) If the terminal presences of the priority connection destinations (one or a plurality of internal terminals) are "available" and "out of range" and the internal terminal registered at the head of the priority connection destinations 106*b* of the database 106 has an "available" terminal presence, then the presence reception APL 102 determines that the one-number presence is "available" (step S309), and subsequently proceeds to step S306.

In this case, the one-number presence "available" is registered as the data corresponding to the one-number in the one-number presences 106*d* of the database 106 in correspondence with that one-number.

Figure 12B:
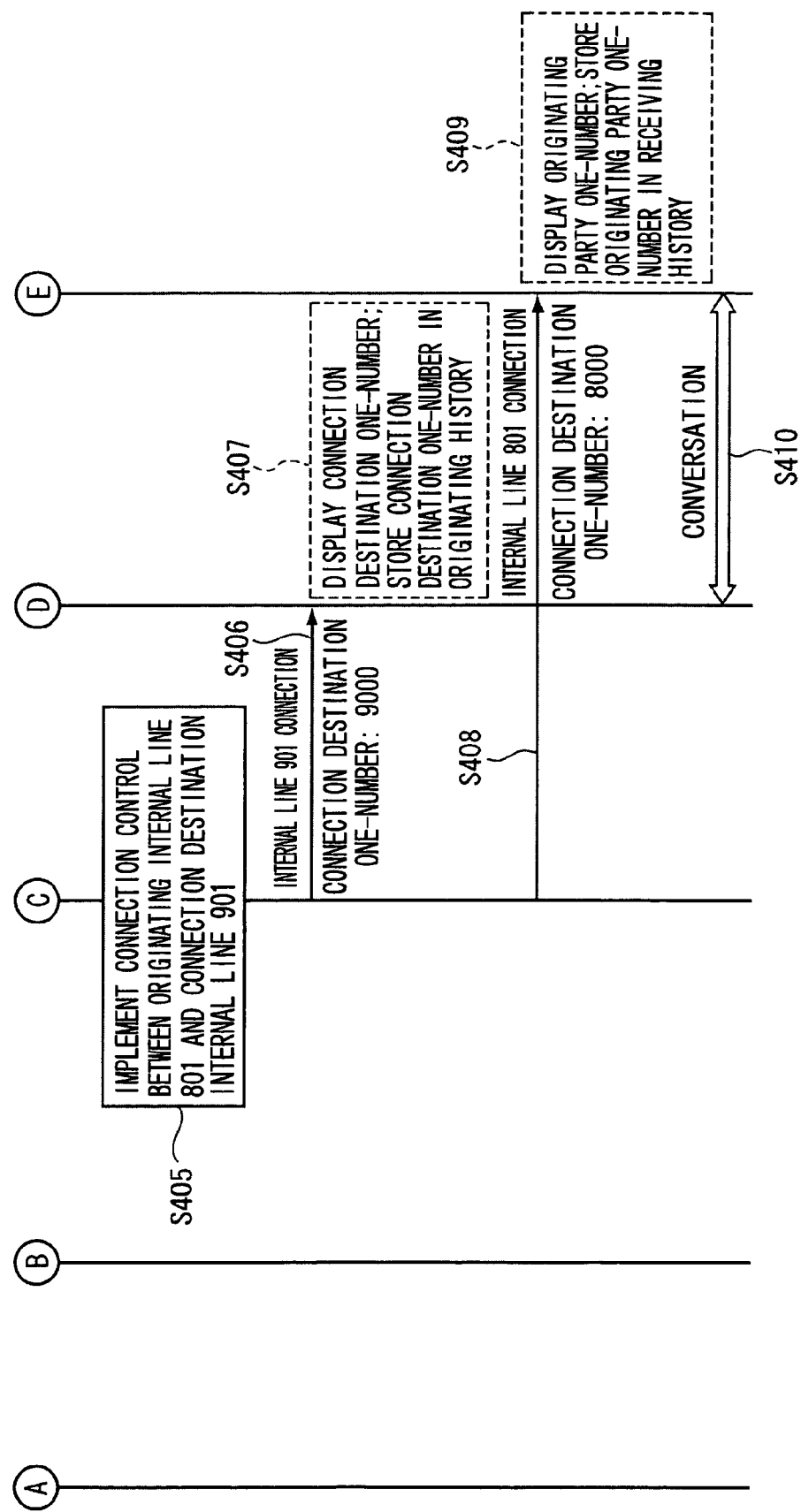

Next, a process of connection processing of the one-number will be described with reference to FIG. 12A and FIG. 12B. FIG. 12A and FIG. 12B are a sequence chart showing a processing sequence of connection processing for the one-number by the IP-PBX system 1.

(A-2-8) Reception of One-Number

The internal terminal (IP telephone) 801 served by the IP-PBX 300 dials the one-number "9000" of the internal terminal (IP telephone) 901 (step S401). This internal terminal (IP telephone) 801 is the originating internal terminal.

At the IP-PBX 300, the call control APL 301 refers to the database 305 and carries out number interpretation of the one-number "9000" received from the internal terminal (IP telephone) 801.

(A-2-9) One-Number Query

If the result of the interpretation is "one-number connection call", the call control APL 301 sends a "one-number interpretation request" to the one-number server 100 via the one-number communication APL 302 (S402). At this time, the one-number dialed by the internal terminal (IP telephone) 801 ("9000" in this example) and the internal number of the internal terminal (IP telephone) 801 ("801" in this example) are added as parameters of the one-number interpretation request.

Figure 13A:
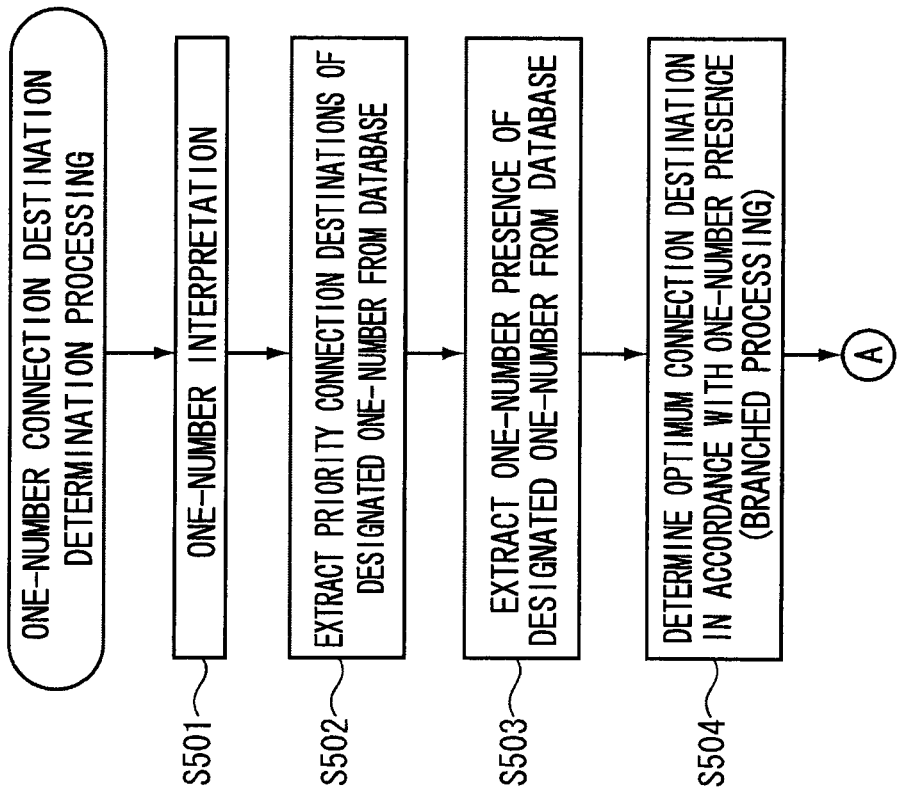
FIG. 13A and FIG. 13B are a flowchart showing a processing sequence of connection destination determination processing for the one-number, by the one-number server relating to the exemplary embodiment of the present invention.
Figure 13B:
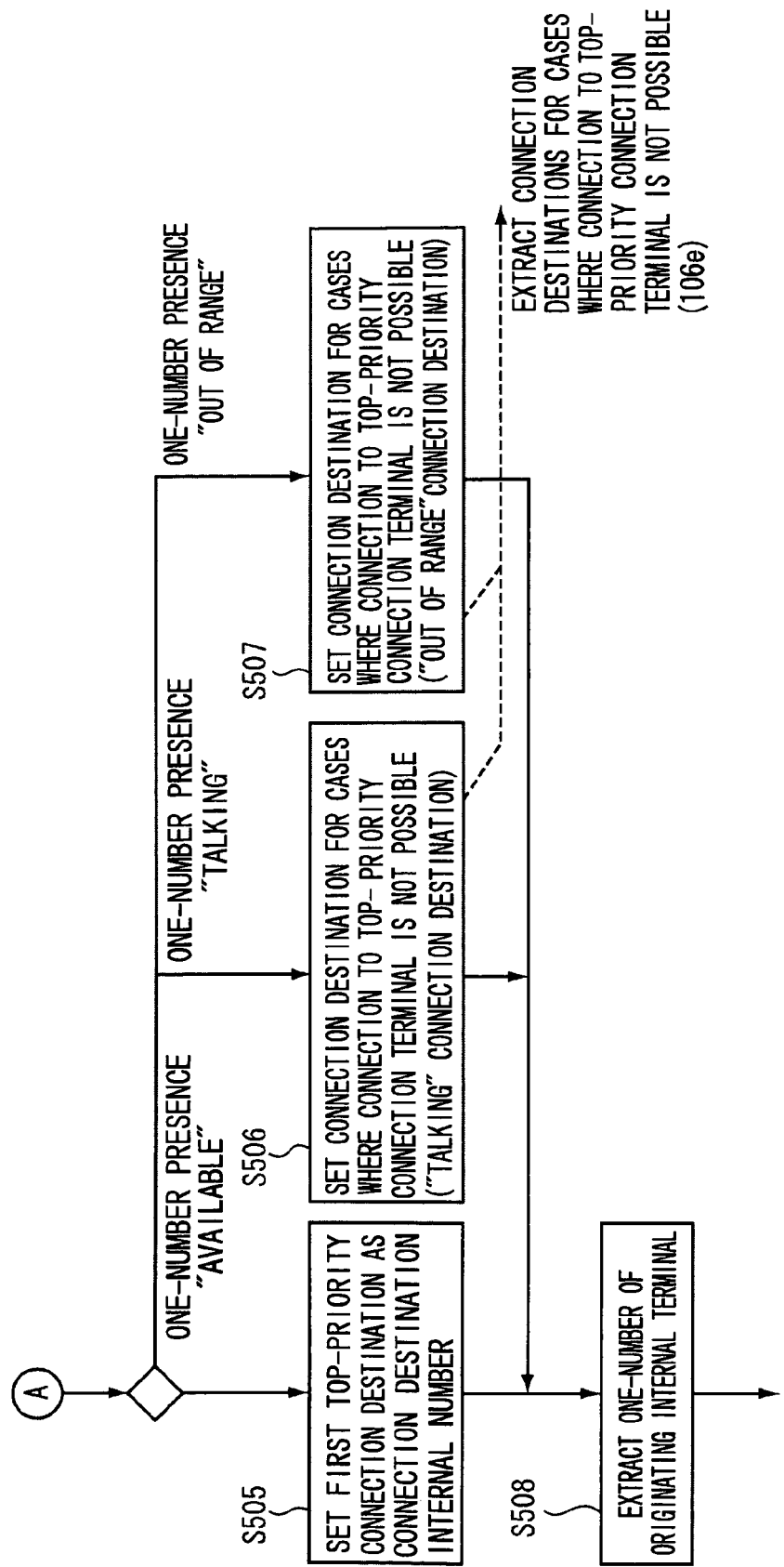

The one-number server 100 receiving the one-number interpretation request from the IP-PBX 300 performs connection destination determination processing (S403), which is described below (see FIG. 13A and FIG. 13B). As will be described in detail hereafter, the one-number interpretation APL 103 and the connection destination determination APL 104 operate cooperatively and extract an optimum connection destination (a top-priority internal terminal, which is a top-priority connection terminal) from the database 106, and the one-number interpretation APL 103 extracts the one-number corresponding to the internal number of the originating internal terminal (IP telephone) 801 from the database 106.

(A-2-10) Return of One-Number Connection Destination to IP-PBX

At the one-number server 100, the connection destination determination APL 104 reports the determined connection destination, the internal terminal (IP telephone) 901, to the IP-PBX communications APL 101, and the one-number interpretation APL 103 reports the extracted one-number "8000" of the internal terminal (IP telephone) 801 to the IP-PBX communications APL 101.

The IP-PBX communications APL 101 returns the reported connection destination internal terminal (IP telephone) 901, the one-number "8000" of the originating internal terminal (IP telephone) 801, and the connection destination one-number "9000" to the one-number communication APL 302 of the IP-PBX 300 (S404).

(A-2-11) Connection of Internal Terminal

At the IP-PBX 300, the one-number communication APL 302 reports the connection destination internal terminal (IP telephone) 901 and the one-number "8000" of the internal terminal (IP telephone) 801, which have been returned from the IP-PBX communications APL 101 of the one-number server 100, to the call control APL 301.

The call control APL 301 implements a call connection between, from the reported information, the connection destination internal terminal (IP telephone) 901 and the originating internal terminal (IP telephone) 801 (S405).

(A-2-12) Display and Storage in History of One-Numbers at Internal Terminals

At the IP-PBX 300, the call control APL 301 sends the one-number "9000" of the internal terminal (IP telephone) 901 to the originating internal terminal (IP telephone) 801 (S406).

Accordingly, the internal terminal (IP telephone) 801 displays the one-number "9000" of the connection destination internal terminal at a display of the IP telephone, and stores the one-number "9000" of the connection destination internal terminal in an originating history of the IP telephone (S407).

The call control APL 301 also sends the one-number "8000" of the originating internal terminal (IP telephone) 801 to the connection destination internal terminal (IP telephone) 901 (S408).

Accordingly, the internal terminal (IP telephone) 901 displays the one-number "8000" of the originating internal terminal at a display of the IP telephone, and stores the one-number "8000" of the connection destination internal terminal in a receiving history of the IP telephone (S409).

When the call connection between the internal terminal (IP telephone) 901 and the internal terminal (IP telephone) 801 is made by the call control APL 301 of the IP-PBX 300, conversation (communication) between the internal terminal (IP telephone) 901 and the originating internal terminal (IP telephone) 801 is enabled (S410).

Next, the connection destination determination processing for the one-number by the one-number server 100 will be described with reference to FIG. 13A and FIG. 13B. FIG. 13A and FIG. 13B are a flowchart showing a processing sequence of the connection destination determination processing for the one-number.

(A-2-13) One-Number Priority Connection Destination Extraction

At the one-number server 100, the IP-PBX communications APL 101 receiving the one-number interpretation request sent from the one-number communication APL 302 of the IP-PBX 300 passes the one-number interpretation request to the one-number interpretation APL 103.

As mentioned earlier, the one-number dialed by the internal terminal (IP telephone) 801 ("9000" in this example) and the internal number of the internal terminal (IP telephone) 801 ("801" in this example) are added to the one-number interpretation request as parameters.

On the basis of the one-number interpretation request passed from the IP-PBX communications APL 101, the one-number interpretation APL 103 carries out one-number interpretation, which means finding priority connection destinations corresponding to the one-number dialed by the originating internal terminal (step S501).

In the example, on the basis of the one-number interpretation request passed from the IP-PBX communications APL 101, the one-number interpretation APL 103 carries out one-number interpretation, meaning finding priority connection destinations that correspond to the one-number "9000" dialed by the internal terminal (IP telephone) 801.

When this one-number interpretation is being carried out, the one-number interpretation APL 103, on the basis of the one-number, queries the database 106, searches the one-numbers 106a of the database 106, and extracts priority connection destinations corresponding to that one-number from the priority connection destinations 106b (step S502). Then, the one-number interpretation APL 103 passes the extracted results and the one-number to the connection destination determination APL 104.

In the example, on the basis of the one-number "9000", the one-number interpretation APL 103 queries the database 106, searches the one-numbers 106a of the database 106, and extracts the IP telephone 901 and the PHS 902 that are the priority connection destinations corresponding to this one-number "9000" from the priority connection destinations 106b (see FIG. 5). The one-number interpretation APL 103 passes these extracted results and the one-number "9000" to the connection destination determination APL 104.

(A-2-14) Extraction of One-Number Presence and Determination of Connection Destination On the basis of the one-number passed from the one-number interpretation APL 103, the connection destination determination APL 104 searches the one-number presences 106d of the database 106 and extracts a presence (one-number presence) of that one-number (see FIG. 5) (step S503). In accordance with the extracted information of the one-number presence, the connection destination determination APL 104 determines an optimum connection destination (the top-priority internal terminal, which is the top-priority connection terminal) (step S504).

Here, in the present exemplary embodiment, one-number presences have three settings: "available", "talking" and "out of range". Thus, the following determination processes (a) to (c) are executed.

(a) If the one-number presence is "available", the connection destination determination APL 104 determines that the first (leading) priority connection destination of the one or more priority connection destinations registered in the fields of the priority connection destinations 106b of the database 106 is the optimum connection destination, that is, the top-priority connection destination (a connection destination internal terminal) (step S505).

(b) If the one-number presence is "talking", the connection destination determination APL 104 determines that a connection destination registered in the connection destinations for cases where connection to top-priority connection terminals is not possible 106e of the database 106 (the connection destination corresponding to the "talking" state) is the optimum connection destination (step S506).

(c) If the one-number presence is "out of range", the connection destination determination APL 104 determines that a connection destination registered in the connection destinations for cases where connection to top-priority connection terminals is not possible 106e of the database 106 (the connection destination corresponding to the "out of range" state) is the optimum connection destination (step S506).

Now this will be more specifically described. The connection destination determination APL 104 searches the one-number presences 106d of the database 106 on the basis of the one-number "9000" passed from the one-number interpretation APL 103, and extracts the presence (the one-number presence) of the one-number "9000".

Then, because the extracted one-number presence is "available" (see FIG. 5), the connection destination determination APL 104 determines that the IP telephone 901, which is the priority connection destination internal terminal registered at the head (first position) in the table of the priority connection destinations 106b relating to the one-number "9000" (i.e., the internal terminal of the top-priority connection destination), is the optimum connection destination (the top-priority connection terminal).

Alternatively, if the connection destination determination APL 104 searches the one-number presences 106d of the database 106 on the basis of a one-number "6000" passed from the one-number interpretation APL 103, and the extracted one-number presence of the one-number "6000" is "talking" (see FIG. 5), then the connection destination determination APL 104 judges that connection to the top-priority connection terminal is not possible, and extracts from the connection destinations for cases where connection to top-priority connection terminals is not possible 106e of the database 106.

Then, because the voicemail device 600 is registered as the connection destination corresponding to a one-number presence of "talking", the connection destination determination APL 104 determines that the voicemail device 600 is the optimum connection destination (see FIG. 5).

Alternatively again, if the connection destination determination APL 104 searches the one-number presences 106d of the database 106 on the basis of a one-number "7000" passed from the one-number interpretation APL 103, and the extracted one-number presence of the one-number "7000" is "out of range" (see FIG. 5), then the connection destination determination APL 104 judges that connection to the top-priority connection terminal is not possible and extracts from the connection destinations for cases where connection to top-priority connection terminals is not possible 106e of the database 106.

Then, because the portable telephone 701 is registered as the connection destination corresponding to a one-number presence of "out of range", the connection destination determination APL 104 determines that the portable telephone 701 is the optimum connection destination (see FIG. 5).

The connection destination determination APL 104 that has determined the optimum connection destination (top-priority connection terminal) in the manner described above passes the determined optimum connection destination to the IP-PBX communications APL 101.

(A-2-15) Extraction of One-Number of Originating Telephone Terminal

At the one-number server 100, the one-number interpretation APL 103 searches the priority connection destinations 106b of the database 106 on the basis of the internal number ("801" in the example) of the originating internal terminal (IP telephone) 801, which was previously added to the one-number interpretation request that has been passed from the IP-PBX communications APL 101, and extracts the one-number corresponding to the matching priority destination terminal from the one-numbers 106a (step S508). The one-number interpretation APL 103 passes the extracted one-number ("8000" in this case) corresponding to the internal number of the originating internal terminal (IP telephone) 801 to the IP-PBX communications APL 101.

Hence, the IP-PBX communications APL 101 returns the following to the one-number communication APL 302 of the IP-PBX 300: the internal number ("901" in this example) of the top-priority destination terminal (top-priority internal terminal), which is the optimum destination terminal passed from the connection destination determination APL 104; the one-number ("8000" in this example) corresponding to the internal number of the originating internal terminal, which is passed from the one-number interpretation APL 103; and the one-number ("9000" in this example) of the connection destination dialed by the originating internal terminal, which was previously added to the received one-number interpretation request. This processing corresponds to S404 in FIG. 7.

Here, the description of the one-number connection destination determination processing by the one-number server 100 ends.

(A-3) Effects of the Exemplary Embodiment

According to the exemplary embodiment, one or more telephone terminals (internal terminals) are associated with a single number (one-number). Thus, when a call is originated with this one-number, a pre-specified top-priority internal terminal (top-priority connection terminal) may be determined to be a connection destination from among the one or more internal terminals (priority connection terminals) that correspond with the one-number.

For example, in a case in which a receiving party owns or has been assigned plural internal terminals, when an originating party specifies (dials) the one-number that corresponds to the plural internal terminals, a pre-specified top-priority internal terminal from among the plural internal terminals corresponding with this one-number is determined to be the connection destination.

Moreover, according to the exemplary embodiment, because the optimum connection destination is determined on the basis of the database in the one-number server, when a call is originated with a one-number, the database may be referred to and the optimum connection destination determined in accordance with a presence corresponding to that one-number.

As an example, in a case in which the presence corresponding with the one-number is, for example, "available", a pre-specified top-priority internal terminal (top-priority connection terminal) from among the one or more internal terminals may be determined to be the optimum connection destination. Alternatively, in a case in which the presence corresponding with the one-number is, for example, "talking", a connection destination for cases when connection to the top-priority connection terminal is not possible, which is, for example, a voicemail device, may be determined to be the optimum connection destination.

According to the exemplary embodiment, plural telephone terminals (internal terminals) may be collectively administered with one-numbers, and connection destinations determined in accordance with priority ranks assigned to the respective telephone terminals. In addition, optimum connection destinations may be determined in accordance with presences of the one-numbers based on presences of the plural telephone terminals.

Consequently, when a caller (originating party) is to call an individual who has been assigned a one-number (a receiving party), it is always sufficient for the originating party to know only the relevant one-number, and the recipient (receiving party) may receive a connection at an optimum telephone terminal in accordance with the priority ranks of the telephone terminals and a presence of the one-number.

According to the exemplary embodiment, registered details of the internal terminals (priority connection terminals) corresponding to a one-number may be altered by individuals (personal PCs). Thus, in a case in which a user moves desk due to a change in organization of a company, the user (personal PC) is associated with the one-number from before the desk move, and an internal terminal after the move is registered as a terminal for the person (the top-priority internal terminal, which is the top-priority connection terminal). Hence, when a call is originated with the one-number from before the move, the internal terminal after the move, which is the top-priority internal terminal, can be determined to be the optimum connection destination.

Therefore, without being aware of a desk move by a receiving party at a connection destination or a change of a connection destination internal terminal or suchlike, an originating party may call with the same one-number for the receiving party. In addition, even when, because of a desk move, the internal number of the internal terminal is different from that before the desk move, the receiving party may receive calls at an internal terminal specified by themselves.

In an internal terminal capable of showing displays, such as an IP telephone, a portable telephone (a portable dual terminal that employs a wireless LAN (WLAN)) or a PHS terminal, an originating history and a receiving history are stored in correspondence with one-numbers. According to the exemplary embodiment, when calling back, redialing or the like with a one-number registered in the originating history or receiving history, it is possible to connect to an optimum connection destination corresponding to that one-number.

According to the exemplary embodiment, in a case in which there is an internal telephone directory for a company, the one-numbers may be registered in the directory instead of the internal numbers of internal terminals. Therefore, even when a user moves desk due to an organizational change within the company, the internal number of an internal terminal after the move is registered in correspondence with the same one-number as before the move, and therefore there is no need to alter or reprint the directory.

According to the exemplary embodiment, when, for example, a one-number relating to reception is used from a public network line, there is no need for intermediate telephoning or the like, and a connection destination will always be reached. Thus, customer satisfaction levels may be improved.

(B) Other Exemplary Embodiments

In the exemplary embodiment, a case has been illustrated in which the present invention is applied to an IP-PBX system. However, an object of application of the present invention is not limited thus. For example, the present invention may also be applied to a system based around an exchange (exchange server) at which a carrier is provided.

What is claimed is:

1. An exchange system comprising:
an exchange apparatus that serves a plurality of telephone terminals; and
a server device that is connected to the exchange apparatus via an exchange network and that, in a case in which the plurality of telephone terminals are grouped, stores in association and administers, for each group, a different single number and identification information of the at least one telephone terminal belonging to the group,
wherein, when a call is originated with a predetermined single number from an originating side telephone terminal, the exchange apparatus performs a query to the server device for a connection destination corresponding to the predetermined single number, and implements a call connection between a telephone terminal of a connection destination, which is a result from the server device in response to the query, and the originating side telephone terminal,
wherein the server device includes:
a database that stores, in correspondence with the different single number of each group,
identification information of the at least one telephone terminal, the identification information of the telephone terminals being different,
presence information corresponding to the predetermined single number, and
alternative connection destination information which represents an alternative connection destination that corresponds to a type of the presence information for a case in which connection to a top-priority destination telephone terminal is not possible, the top-priority destination telephone terminal being a connection destination among the at least one telephone terminal; and
a connection destination determination processing logic that, when the server device receives the query for a connection destination for the predetermined single number from the exchange apparatus, determines an optimum connection destination on the basis of storage contents of the database, and returns information representing the optimum connection destination to the exchange apparatus,
wherein the presence information includes not only the "talking" or "out of range" of the telephone terminal of the connection destination but also activity of a user of the telephone terminal of the connection destination,
wherein the activity of the user includes any activity registered by the user.

2. The exchange system of claim 1, wherein
the exchange apparatus sends to the originating side telephone terminal the predetermined single number that corresponds to the connection destination telephone terminal and the predetermined single number is stored at the originating side telephone terminal as originating history information, and
the exchange apparatus sends to the connection destination telephone terminal a single number that corresponds to the originating side telephone terminal and the predetermined single number is stored at the connection destination telephone terminal as receiving history information.

3. The exchange system of claim 1, wherein the connection destination determination processing logic extracts at least one telephone terminal corresponding to the predetermined single number to serve as priority connection destinations and, if the presence information corresponding to the predetermined single number indicates that communication is possible, returns to the exchange apparatus identification information representing a telephone terminal that is a pre-specified top-priority connection destination among the extracted priority connection destinations, to serve as the information representing the optimum connection destination.

4. The exchange system of claim 1, wherein the connection destination determination processing logic extracts at least one telephone terminal corresponding to the predetermined single number to serve as priority connection destinations and, if the presence information corresponding to the predetermined single number indicates that communication is not possible, returns to the exchange apparatus the alternative connection destination information corresponding with the predetermined single number, to serve as the information representing the optimum connection destination.

5. A server device that is connected to an exchange apparatus via an exchange network, the exchange apparatus serving a plurality of telephone terminals, and the server device comprising:
a database that, in a case in which the plurality of telephone terminals are grouped, stores, in correspondence with a different single number for each group,
identification information of at least one telephone terminal, the identification information of the telephone terminals being different,
presence information corresponding to the predetermined single number, and
alternative connection destination information which represents an alternative connection destination that corresponds to a type of the presence information for a case in which connection to a top-priority destination telephone terminal is not possible, the top-priority destination telephone terminal being a connection destination among the at least one telephone terminal;
a presence information determination logic that collects presence information of the plurality of telephone terminals and, for each group, determines the presence information corresponding to the predetermined single number of the group on the basis of the presence information of the at least one telephone terminal belonging to the group; and
a connection destination determination processing logic that, when the server device receives a query for a connection destination for a predetermined single number from the exchange apparatus, determines an optimum connection destination on the basis of storage contents of the database, and returns information representing the optimum connection destination to the exchange apparatus,
wherein the presence information includes not only the "talking" or "out of range" of the telephone terminal of the connection destination but also activity of a user of the telephone terminal of the connection destination,
wherein the activity of the user includes any activity registered by the user.

6. The server device of claim 5, further comprising a telephone terminal information update logic that, when an update of registration details relating to the identification information of a telephone terminal stored in the database is instructed by an access to the server device by an information processing device connected via the exchange network, updates storage contents of the database on the basis of updated identification information of the telephone terminal.

7. The server device of claim 5, further comprising a presence information update logic that, when an update of the presence information corresponding to one of the single numbers stored in the database is instructed by an access to the server device by an information processing device connected via the exchange network, updates storage contents of the database on the basis of updated presence information.

* * * * *